(12) United States Patent
Augustine et al.

(10) Patent No.: US 7,322,898 B2
(45) Date of Patent: Jan. 29, 2008

(54) ACTIVE FRONT STEERING ACTUATOR

(75) Inventors: Michael J. Augustine, Mayville, MI (US); Ratko Menjak, Frankenmuth, MI (US)

(73) Assignee: Delphi Technologies, Inc., Troy, MI (US)

( * ) Notice: Subject to any disclaimer, the term of this patent is extended or adjusted under 35 U.S.C. 154(b) by 194 days.

(21) Appl. No.: 11/219,499

(22) Filed: Sep. 2, 2005

(65) Prior Publication Data
US 2006/0052201 A1    Mar. 9, 2006

(51) Int. Cl.
  *B62D 11/06*   (2006.01)
  *B62D 5/06*    (2006.01)
  *B62D 5/04*    (2006.01)
(52) U.S. Cl. .................. 475/19; 180/428; 180/444
(58) Field of Classification Search .......... 475/19; 180/443–444, 417, 428, 441
  See application file for complete search history.

(56) References Cited

U.S. PATENT DOCUMENTS

| 4,871,040 | A | 10/1989 | Zuraski et al. ............. 180/142 |
| 5,119,898 | A | 6/1992 | Eckhardt et al. ............ 180/142 |
| 5,265,019 | A | 11/1993 | Harara et al. ............ 364/424.05 |
| 5,704,446 | A | 1/1998 | Chandy et al. ............. 180/446 |
| 6,135,233 | A * | 10/2000 | Yamauchi ................... 180/443 |
| 6,896,090 | B2 * | 5/2005 | Kanda et al. ............... 180/402 |
| 7,063,636 | B2 * | 6/2006 | Augustine ...................... 475/3 |
| 2002/0029922 | A1 | 3/2002 | Richardson et al. ........ 180/444 |
| 2006/0264290 | A1 * | 11/2006 | Arbanas ....................... 475/18 |

OTHER PUBLICATIONS

U.S. Appl. No. 10/868,612, filed Jun. 15, 2004.

* cited by examiner

*Primary Examiner*—Tisha Lewis
(74) *Attorney, Agent, or Firm*—Michael D. Smith

(57) ABSTRACT

A steering system includes a differential transmission having an input shaft and an output shaft, a rotary input device attached to the input shaft, a movable steering effector in operable communication with the output shaft, an angular-to-linear converter which converts a rotative motion of the output shaft to a linear motion that acts to move the steering effector. The motion of the steering effector enables path alteration of a vehicle. The steering system also includes an electromotive actuator in operable communication with the differential transmission. An activated electromotive actuator provides an active alteration of a speed change between a speed of the input shaft and a speed of the output shaft and a deactivated electromotive actuator provides a default speed change between the speed of the input shaft and the speed of the output shaft.

16 Claims, 7 Drawing Sheets

ACTIVE FRONT STEERING ACTUATOR

BACKGROUND OF THE INVENTION

The present disclosure relates generally to vehicle steering control systems and, more particularly, to a mechanically linked active steering system.

Conventional vehicular steering systems have an articulated mechanical linkage connecting an input device (e.g., steering wheel or hand-wheel) to a steering actuator (e.g., steerable road wheel). Even with power assisted steering in an automobile, for example, a typical hand-wheel motion directly corresponds to a resulting motion of the steerable road wheels, substantially unaffected by any assist torque.

However, for a vehicular steering system with active steering, such as that used in an automotive front-controlled steering system, a given motion of the hand-wheel may be supplemented by an additional motion, such as that from a differential steering actuator, which translates into a motion of the steerable road wheels that does not necessarily correspond to the given motion of the hand-wheel. Consequently, when the differential steering actuator is inactive, the motion of the steerable road wheels directly corresponds to the hand-wheel motion due to the articulated mechanical linkage, just as in conventional systems.

The term "active steering" relates to a vehicular control system, which generates an output that is added to or subtracted from the front steering angle, wherein the output is typically responsive to the yaw and/or lateral acceleration of the vehicle. It is known that, in some situations, an active steering control system may react more quickly and accurately than an average driver to correct transient handling instabilities. In addition, active steering can also provide for continuously variable steering ratios in order to reduce driver fatigue while improving the feel and responsiveness of the vehicle. For example, at very low speeds, such as that which might be experienced in a parking situation, a relatively small rotation of the hand-wheel may be supplemented using an active steering system in order to provide an increased steering angle to the steerable road wheels.

Prior devices act to modify the relationship between driver input and steering output by providing a supplemental power source within the steering system that actively augments the position of the wheels or acts to augment the control of the primary steering power source. Examples include (1) the addition of a second axially actuated device in addition to the primary axial translating device (e.g., hydraulic assisted steering rack), and (2) addition of a motor driven differential device between the operator and the steering valve of a typical hydraulic power steering system. In each case, additional power is added to the system through the added component to affect steering augmentation and in each case a portion of that power is transmitted to the operator as secondary feedback. Also noteworthy is the requirement in each case that the driver provide the upstream reaction to the system input in order for the desired steering change to be realized. Additionally, in the example number two, any lash in the differential will be directly felt by the operator.

Without operator reaction, most of the system input will be directed to the operator input device (i.e., steering wheel) and result in no change to the vehicle path. Conversely, steer-by-wire systems have the ability to directly control the primary steering actuator to affect the operator-to-steerable device kinematic relationship. However, steer-by-wire systems do not maintain a full-time mechanical link between the operator and the steerable device.

Thus, it is desirable to provide active steering orientation of the steerable device directly, as in by-wire systems, and maintain a mechanical link between the operator input and steerable device, as in prior active steer systems, while isolating the operator to some degree from such steerable device orientation modifications and associated feeback.

BRIEF DESCRIPTION OF THE INVENTION

Disclosed herein is a steering system including: a differential transmission having an input shaft and an output shaft; a rotary input device attached to the input shaft; a movable steering effector in operable communication with the output shaft; an angular-to-linear converter which converts a rotative motion of the output shaft to a linear motion that acts to move the steering effector, wherein the motion of the steering effector enables path alteration of a vehicle; and, an electromotive actuator, in operable communication with the differential transmission, wherein an activated electromotive actuator provides an active alteration of a speed change between a speed of the input shaft and a speed of the output shaft and a deactivated electromotive actuator provides a default speed change between the speed of the input shaft and the speed of the output shaft.

BRIEF DESCRIPTION OF THE DRAWINGS

Referring to the exemplary drawings wherein like elements are numbered alike in the several Figures.

DETAILED DESCRIPTION

Figure 1:
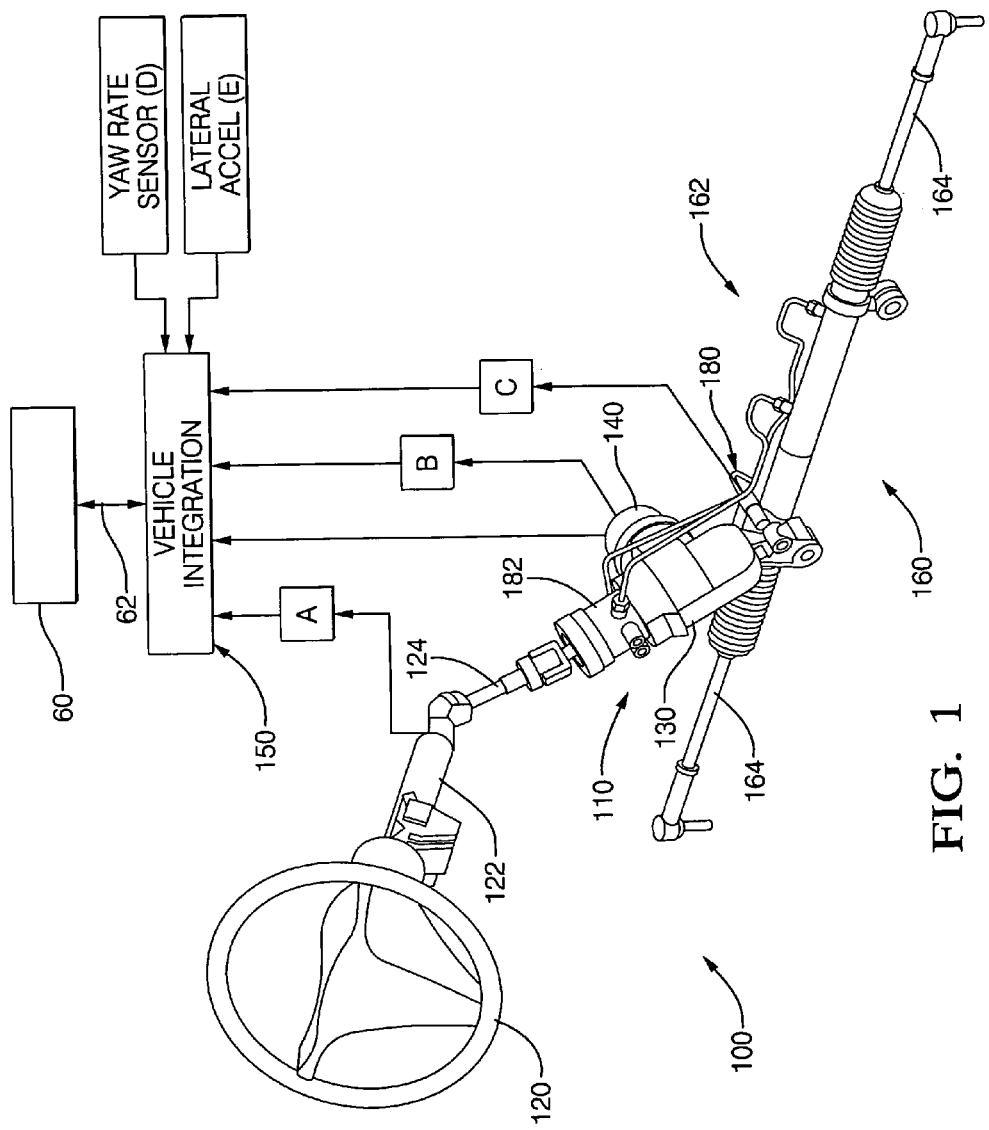
FIG. 1 shows a top level block diagram depicting an exemplary embodiment of an active steering system for a vehicle.

Referring now to FIG. 1, an active steering system 100 is shown and discussed. The system utilizes an electromechanical actuator, in this instance, a steering actuator 110, and a control unit 150 executing control algorithms, responsive to input signals including but not limited to vehicle speed, yaw and lateral acceleration sensors, hand wheel position, and motor position sensors to provide both variable ratio and stability control. Control unit 150 communicates with a storage medium through a data signal 62. In an exemplary embodiment, variable ratio is a control algorithm configured to: reduce driver workload to maneuver vehicle, improve steering feel at various speeds and driving conditions, and change steering feel at all speeds based on the amount and rate of steering input. In yet another exemplary embodiment, stability control is a control algorithm configured to: reduce oversteer by leading the driver with countersteer, start vehicle correction before brake-based stability system is activated to reduce obtrusiveness of brake based stability systems, integrate with brake-based stability systems to allow optimization of brake and steering systems to reduce stopping distances.

The following description refers directly to the embodiment of FIG. 1 and is not intended to limit the possible embodiments to this specific configuration. The active steering system 100 includes, but is not limited to a steering actuator 110, with an electric motor 140 and gear train or differential shown generally at 130. An input device, such as a steering wheel 120, for operator input is coupled to a mechanical input of the steering actuator 110 to facilitate combination with the output of the electric motor 140. Active steering system 100 further includes control unit 150 and various sensors, shown as A-E, interfaced with the control unit 150. The various sensors are operatively coupled with control unit 150 to measure and transmit respective sensed parameters to the control unit 150.

The steering actuator 110 is further coupled with a steering mechanism 160, which includes a power assist mechanism 162 that transfers inputs to output shafts 164 providing a force assistance to oppose system and vehicle loads to aid an operator in achieving the desired output. The output shaft 164 is operatively connected to an output device, such as a steerable wheel (not shown), to direct the vehicle. Operator input is provided through steering wheel 120 that is connected to a steering column 122. The steering column 122 is connected to the steering actuator 110 through an intermediate shaft 124. The steering actuator 110 is connected to steerable wheels (not shown) through tie rods or output shafts and corresponding steering knuckles operably communicating with respective steerable wheels (not shown).

It will be appreciated that while in an exemplary embodiment as disclosed herein the power assisted steering mechanism utilizes a hydraulic configuration to provide assist torque, other configurations are possible for example an electric power assist could also be employed. Such a differential steering actuator is disclosed in U.S. patent application Ser. No. 09/812,240, U.S. Patent Publication No. 2002-0029922 A1 the contents of which are incorporated by reference herein in their entirety. An illustrative configuration that employs hydraulic assist may be found in U.S. Pat. No. 4,871,040 the contents of which are incorporated by reference herein in their entirety. An illustrative electric power steering system that provides assist torque to aid the driver is disclosed in U.S. Pat. No. 5,704,446 the contents of which are incorporated by reference herein in their entirety.

The steering actuator 110 is essentially a hydraulically assisted rack and pinion gear with an electric motor driven differential 130 embedded within the hydraulic circuit. The hydraulic system can be activated by both operator and motor inputs. Embedding the differential within the assist loop allows friction associated with the differential to have little impact on the steering torque felt by the operator as the assist function reacts most of this friction. Any lash present in the differential and any vibration generated by the differential during motor activation will be attenuated and filtered by the damping and compliance properties of the assist servo located between the differential and the operator. The differential could also be employed between the operator and the assist loop, however the added friction associated with the differential will have a direct affect on steering feel, any lash within the differential will be felt by the operator, and motor generated vibration can be more readily transmitted to the input device and operator.

The hydraulic valve details are as described in U.S. Pat. No. 4,871,040 with a differential input gear substituted in place of the helical pinion gear portion of the aforementioned valve assembly.

A hydraulic pump and a hydraulic reservoir (both not shown) are included to feed hydraulics in both the steering valve 182 and power assist steering mechanism 162. An electronically controlled valve torque supplementing device may be included but not shown for control of steering valve 182 and power assist steering mechanism 162. For example, U.S. Pat. No. 5,119,898, issued 9 Jan. 1992 describes a hydraulic power steering system manufactured by General Motors Corporation, and identified by the tradename MAGNASTEER™ including a steering gear in which an electromagnetic mechanism is selectively operable to vary the performance characteristics of a conventional proportional control valve of the steering gear.

Vehicle state sensors to monitor vehicle dynamic conditions (velocity, yaw, and the like) are in communication with actuator 110 via controller 150 and power distribution equipment to implement system functionality while a computer based database and algorithms define kinematic and kinetic relationship between operator input and steering orientation/effort based on vehicle state and sensor data.

An exemplary embodiment of steering actuator 110 includes a valve activated hydraulic power assist device 180 for orienting the steerable wheels and reacting to external loads. Differential device 130 is disposed between a steering valve 182 and the power assist device 180. The differential 130 acts as a positive mechanical link between the operator and the steerable device.

Figure 2:
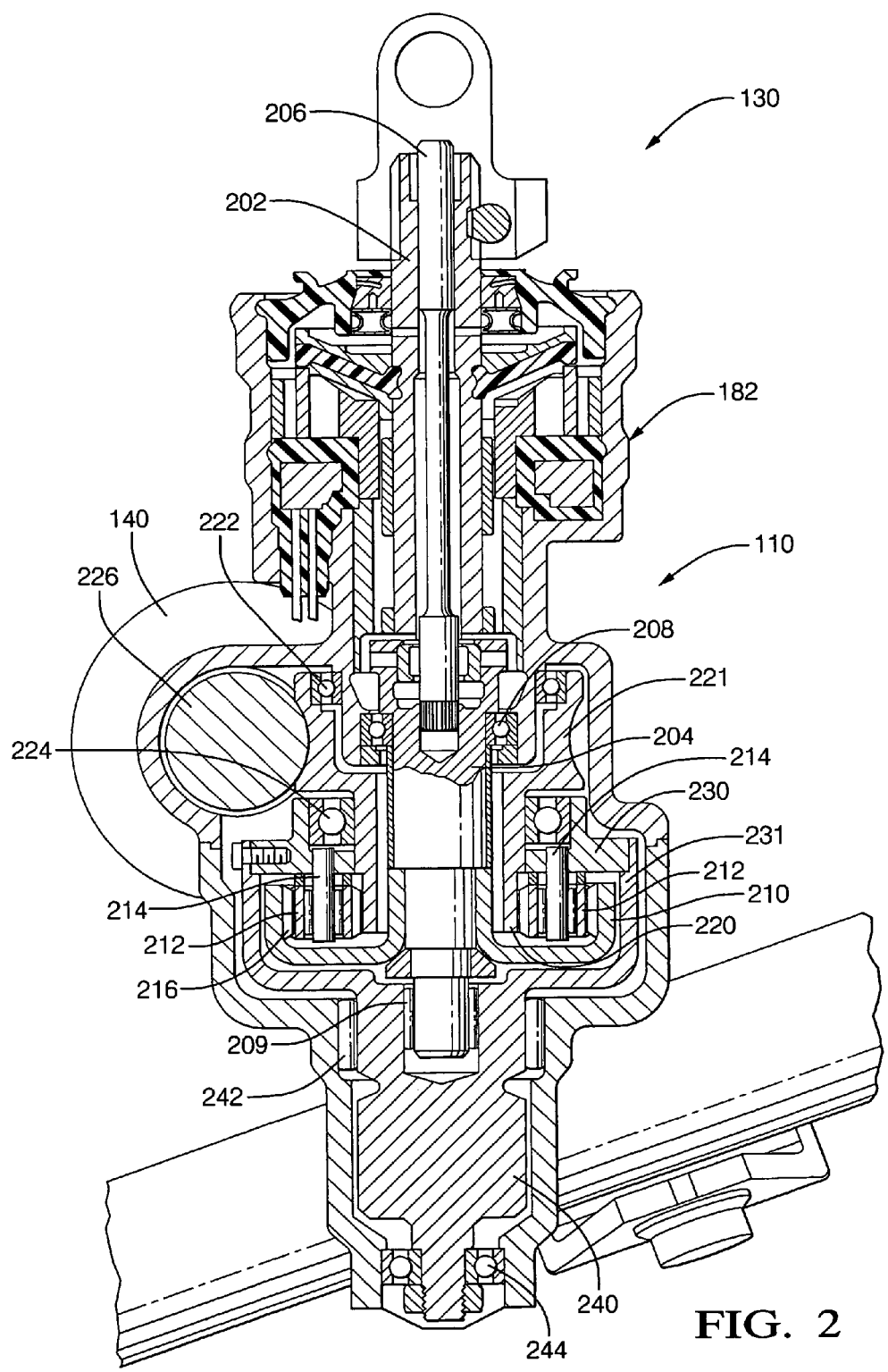
FIG. 2 is a cross-section view to show the structure of an exemplary embodiment for a steering apparatus employed in the active steering system of FIG. 1.

Referring now to FIG. 2, steering actuator 110 is illustrated in greater detail. A related mechanism is disclosed in U.S. Pat. No. 6,135,233, the contents of which are incorporated by reference herein in their entirety. U.S. Pat. No. 5,265,019 differential discloses a specific simple epicyclic differential having a speed and torque change at the output with respect to the input, however, the differential is not delashed.

Steering actuator 110 includes a spool shaft 202, which is connected to the intermediate shaft 124 (shown in FIG. 1). Spool shaft 202 is connected to input shaft 204 over torsion bar 206. An upper input shaft bearing 208 and a lower input shaft bearing 209 support input shaft 204. Input shaft 204 is connected to input gear 210, which in this embodiment is a ring gear. Input gear 210 is meshed with planetary gears 212 that rotate about planet shaft 214. Planetary gears 212 are supported by planet bearings 216, which can incorporate a delash gear. The configuration of an exemplary embodiment of the delash gear is also disclosed in copending U.S. patent application Ser. No. 10/868,612, entitled DOUBLE FLANK DELASH GEAR MECHANISM, filed Jun. 15, 2004 and incorporated herein by reference in its entirety. Low friction details at each end of a corresponding planet shaft are optionally included.

Planetary gears 212 are also meshed with a sun gear 220, which in this embodiment is also operably connected to a worm gear 221. Sun gear 220 and worm gear 221 are supported by bearings 222 and 224. Worm gear 221 meshes with a worm 226 that is operably connected to motor 140. Steering actuator 110 also includes a carrier 230 that carries planet pins 214 of planetary gears 212 and is connected to output shaft 231, which includes a pinion 240. Output shaft 231 is supported by bearings 242 and 244.

During the default operation, which means there is no motor input, but with hydraulic assist, there is a default kinematic relationship between the input shaft 204 and the output shaft 231 in which there is a speed change between the input shaft and the output shaft. Referring to FIGS. 1 and 2, as the driver turns the hand wheel 120, intermediate shaft 124 turns and so does spool shaft 202. Spool shaft 202 and input shaft 204 are rotatable relative to each other over torsion bar 206. Input shaft 204 rotates input gear 210, which rotates planet gear 212. Since motor 140 is not in operation, sun gear 220 is fixed in its current location. As planet gear(s) 212 are rotating about pins 214 and traversing along the outside of sun gear 220. The rotation pushes pins 214 and carrier 230 which imparts rotation to output shaft 231 and pinion 240, which then translates rack (not shown).

In one exemplary embodiment, the input to output ratio is about 3:2 and thus the output speed is reduced to about ⅔ of the input speed. In order to normalize the hand wheel motion to rack translation, pinion 240 is increased in size by a reciprocal proportion to the speed change. Thus, pinion 240 is about 1.5 times the size of a standard pinion to compensate for the 3:2 ratio through differential actuator 130. The embodiment can further be described as the steering system including a planetary gear set having a gear ratio and an angular-to-linear converter, which for example may be a rack and pinion gear, having a translational ratio wherein the translational ratio neutralizes the effect of the planetary gear ratio. In addition, the input to output ratio can be any ratio between the theoretical limits 2:1 and 1:1. However, the larger the ratio, the larger the pinion will need to be to compensate for the default differential ratio. The smaller the ratio the greater the relative gear set size and motor speed required for any given ratio. Thus, in an exemplary embodiment, the ratio ranges from about 1.3 to about 1.7, which means that the speed reduces from the input shaft to the output shaft to about 0.8 to about 0.6 times.

In normal, powered operation, the kinematic relationship between the operator and the steerable wheels is continuously variable. Operator input (torque), position, and speed, derived from sensor(s), are input into controller 150 along with vehicle speed and yaw rate. A database of predefined relationships relating vehicle speed, and operator input position and speed are used to establish the desired steering ratio. A second database relating vehicle speed to maximum stable yaw rate may be used to invoke stability correction when the stable value is exceeded. The stability correction is in addition to the variable ratio to define the desired instantaneous overall steering ratio. The steering valve geometry and compliance establishes the basic relationship between operator torque and steering assist power. This basic relationship is modified whenever either a ratio modification and/or a stability correction, and/or supplemental torque is invoked. In this situation the power fluid flow to the power assist is either increased or decreased, per the controller, to establish the required steering modification. The steering modification is monitored by comparison of signals from position sensor A between the handwheel 120 and the differential 130, and sensor B at the motor 140. In addition, a position sensor C may also be located at the rack for diagnostic purposes or redundancy. This sensor may be a rotary or linear sensor activated by the rotation of the pinion or translation of the rack.

When the signals differ from the predefined relationship, the differential motor 140 is commanded to activate in proportion to the steering modification such that the motor driven differential input augments the valve output to the power assist while simultaneously modifying the input to output ratio. Supplemental torque is commanded in proportion to the motor command to counter the valve torque associated with motor input, resulting in reduction or elimination of torque modification feedback to the operator. Steering input position is also monitored with respect to motor commanded position to determine if the operator is providing reaction torque at the input device. This improves the overall control of the system and eliminates the possibility of a "run away" steering input device if the operator is not actively controlling the input, where the system could otherwise continue to command steering modifications that are not realized because the motor power is converted into steering input motion with no vehicle path change.

Figure 3:
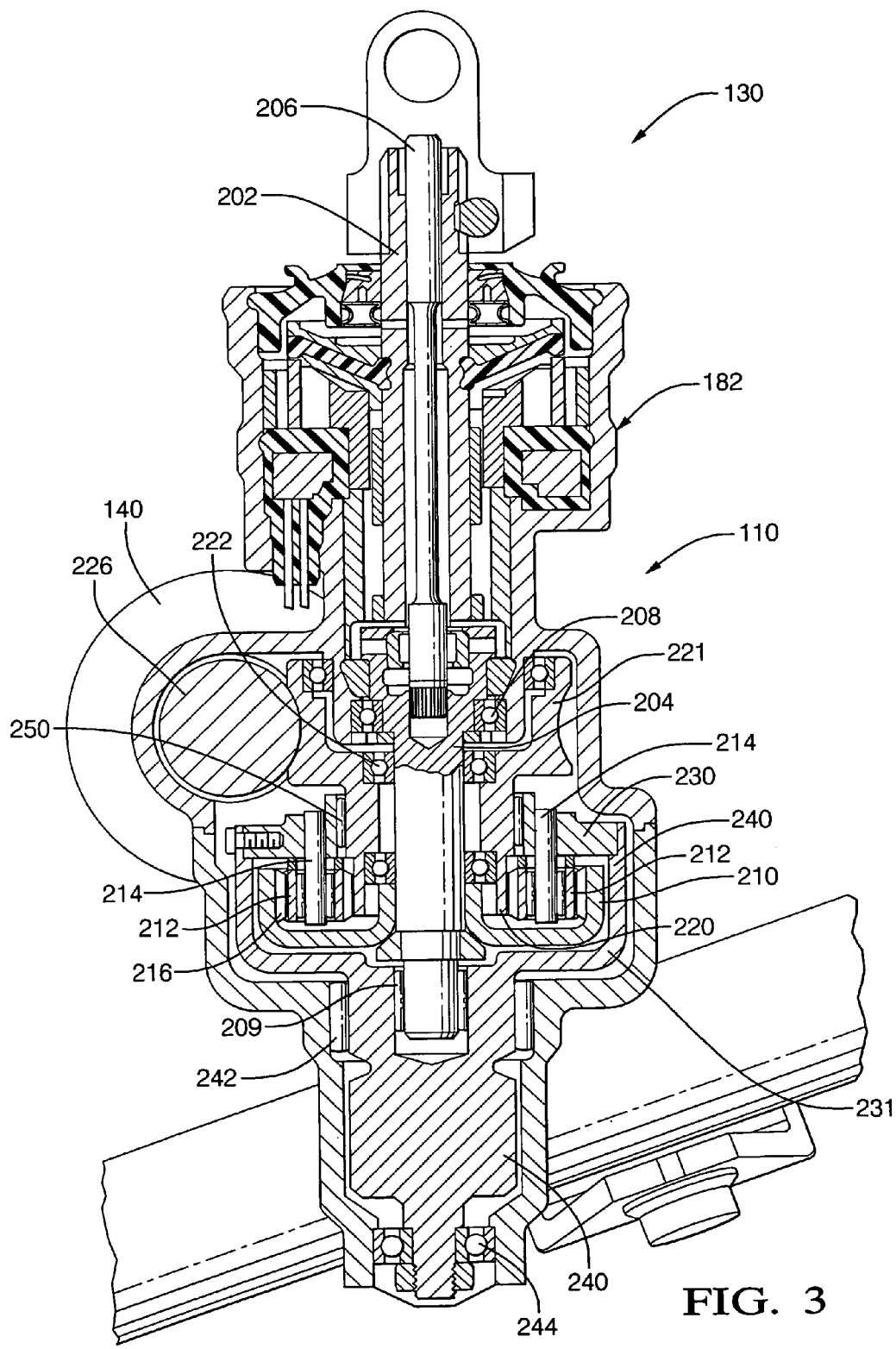
FIG. 3 is a cross-section view of an alterative embodiment of the steering apparatus of FIG. 2.

Referring to FIG. 3, an alternative embodiment of differential actuator 130 is illustrated. This embodiment is similar to the embodiment illustrated in FIG. 2; however, the bearing positions are different. For instance, upper sun bearing 222 and lower sun bearing 224 are shown in a different location with respect to sun gear 220. An optional bearing 250 redundantly keeps planetary gears 212 in the right position over carrier 230 and planetary pins 214.

Figure 4:
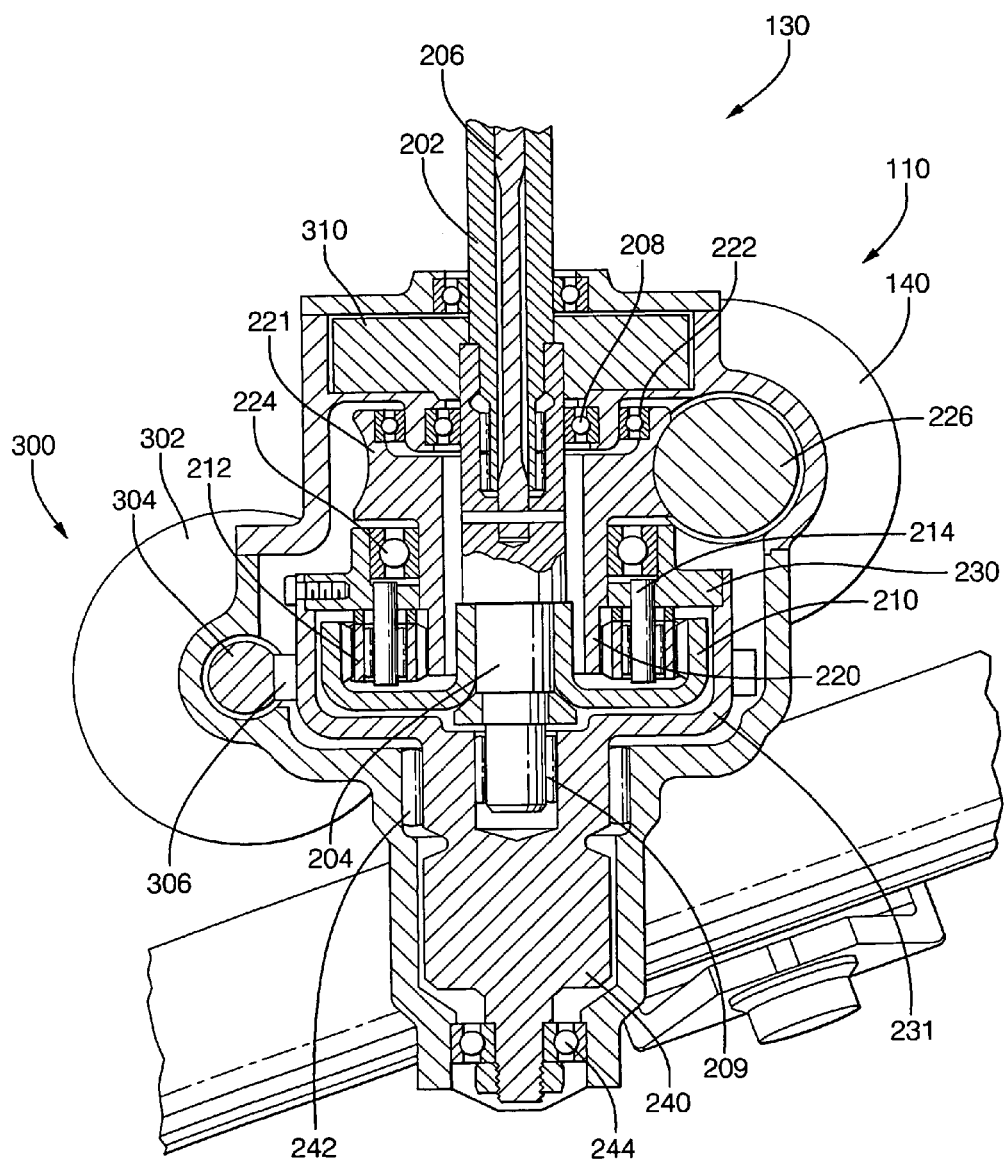
FIG. 4 is a cross-section view of an alterative embodiment of the steering apparatus of FIG. 2.

Referring to FIG. 4, an alternative embodiment of differential actuator 130 is illustrated. This embodiment is similar to the embodiment illustrated in FIG. 2; however, the valve 182 is replaced with an electric power steering actuator 300. Electric power steering actuator 300 has a motor 302 with a worm 304 and a worm gear 306, which is operably joined to output shaft 231. In addition, a torque sensor 310 is located at shaft 202. All other reference numbers are the same as FIG. 2.

During a default operation, which means there is no motor 140 output, but with electric power assist from motor 302, the actuator 110 operates the same as the actuator in FIG. 2. During assist operation, when shaft 202 rotates, torsion bar 206 twists and torque sensor 310 sends a signal to the control unit 150 (see FIG. 1). The control unit 150 provides electric power to motor 302, which rotates worm 304, worm gear 306, output shaft 231, and pinion 240, which then translates the rack (not shown). In the non-default case, sensors send signals to the control unit 150 and the control unit 150 then signals the motor 140 to turn on, which rotates worm 226 and sun gear 220 for rotation augmentation.

Figure 5:
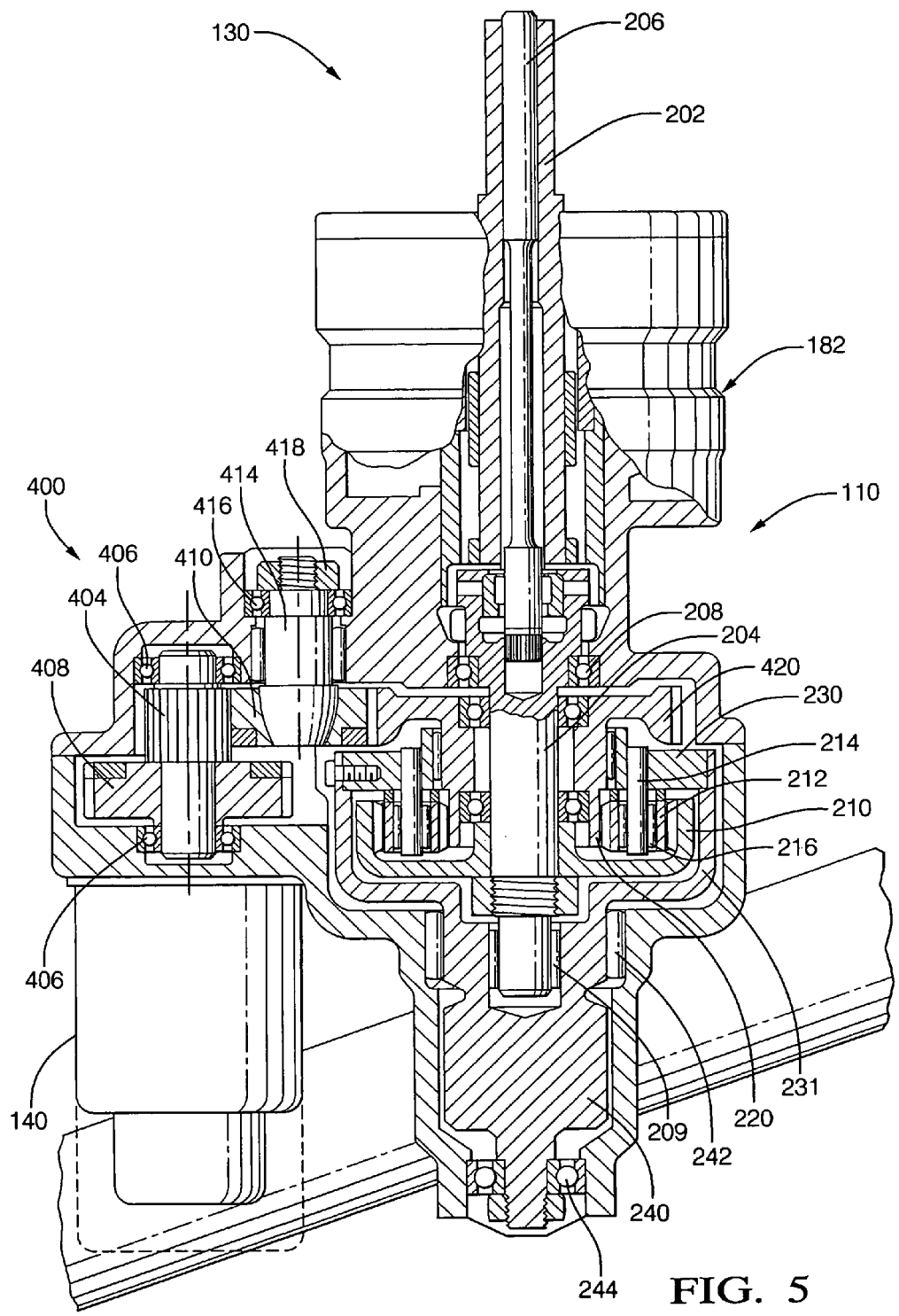
FIG. 5 is a cross-section view of an alterative embodiment of the steering apparatus of FIG. 2.
Figure 6:
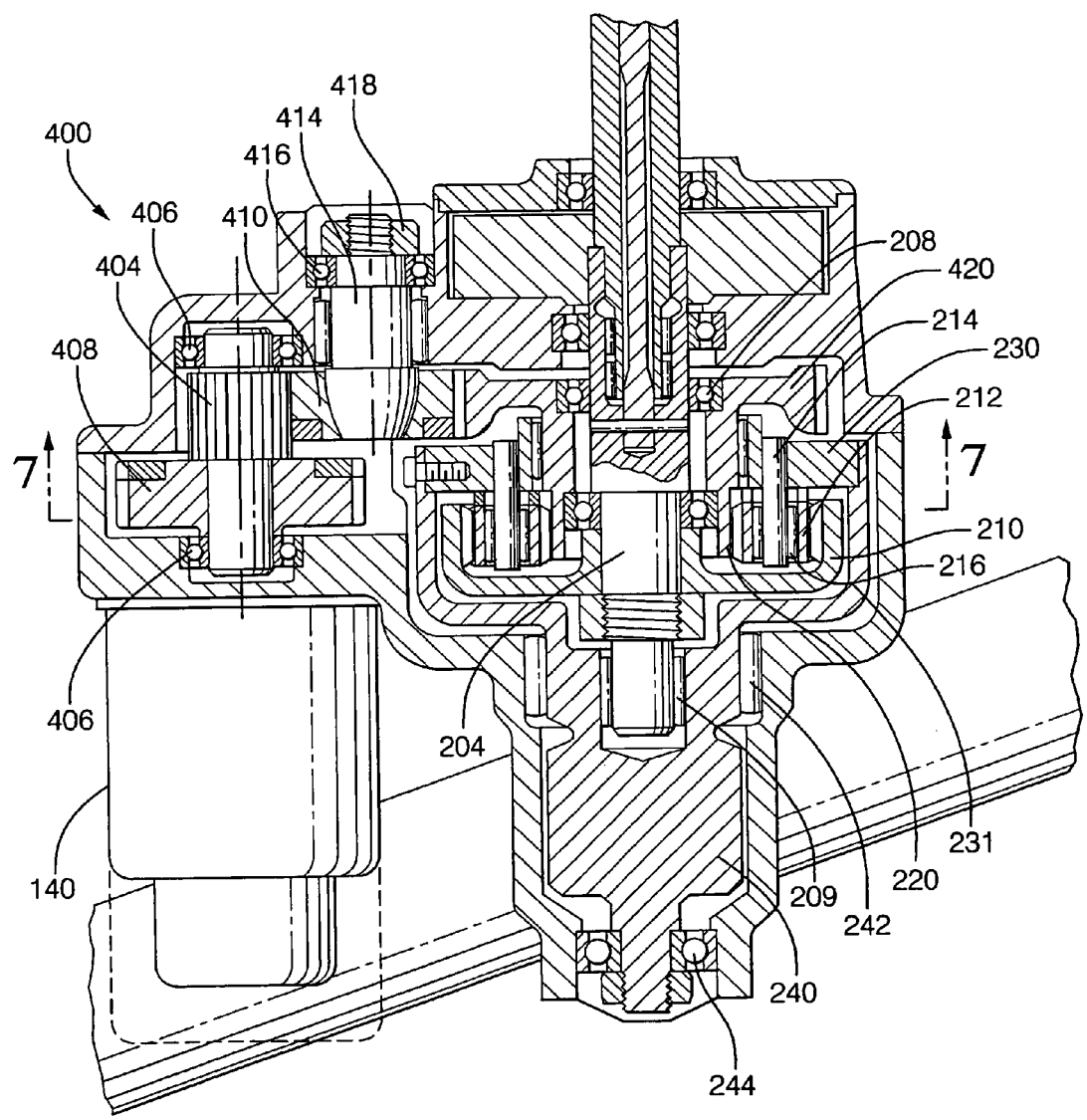
FIG. 6 is a cross-section view of an alterative embodiment of the steering apparatus of FIG. 2.
Figure 7:
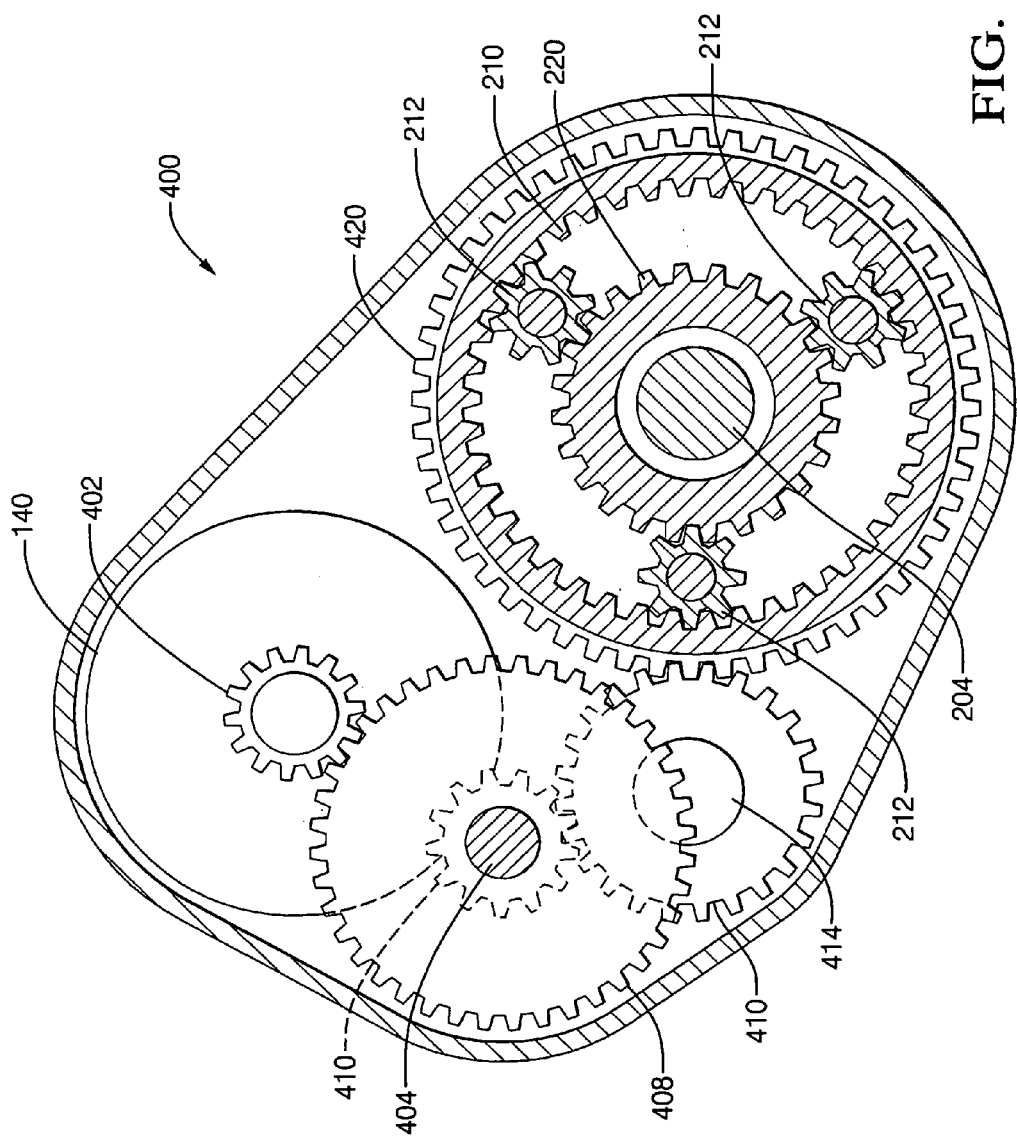
FIG. 7 is a top schematic view of a parallel axis gear train of the steering apparatus of FIGS. 5 and 6.

Referring to FIGS. 5-7, alternative embodiments of differential actuator 130 are illustrated. These embodiments are similar to the embodiment illustrated in FIGS. 2 and 4, respectively; however, the transmission mechanization between the motor 140 and the differential actuator 130 is different. FIG. 5 illustrates the valve 182 (like FIG. 2) and FIG. 6 illustrates the torque sensor 310 (like FIG. 4). FIGS. 5-7 illustrate a parallel axis gear train 400 that conveys the desired torque and speed from the motor 140 to the sun gear 220. The train 400 may employ spur gear or helical gear forms and may be configured to reduce lash. The gear train embodiment as shown comprises a motor shaft (not shown) with a motor shaft gear 402. A stepped shaft 404 is supported by bearings 406 and has an upper gear 408 that meshes with the motor shaft gear 402 and a lower gear 410 that meshes with an idler gear 412. Shaft assembly 414 is supported by a bearing 416 and retained with a nut 418. An external gear 420 is fixed to the sun gear 220 and meshes with idler gear 410. The idler gear 410 and stepped shaft gears are supported within the housing assembly by bearings.

Exemplary embodiments of the invention include an active steering system with variable assist. The system includes a differential actuator that has an input rotation through an input shaft and an output rotation through an output shaft. There is a default kinematic relationship between the input shaft and the output shaft such that there is a speed change. The speed change is a reduction in speed between the input shaft and the output shaft. In addition, there is a pinion in operable communication with the output shaft and the pinion is increased in size by a reciprocal or nearly reciprocal proportion to the speed change ratio.

In an exemplary embodiment, the speed of the output shaft to the speed of the input shaft ranges from about 0.6 about 0.8 times. The input gear is a ring gear. The differential actuator has rotatable mechanisms to vary the ratio between an input device, such as a hand wheel, and an output device, such as the steerable wheels. The differential actuator is disposed between the input device and the steering mechanism. A steering valve disposed between the input device and the differential actuator. The system further includes a controller in communication with the differential actuator, the steering valve and the controller are configured to provide a supplement torque to the input device, and the supplemental torque is in proportion to a motor current command. The system further includes a power assist mechanism coupled to the differential actuator and the output device, the power assist mechanism provides an assist torque responsive to activation of a valve or an electric power assist system. The system further includes a power assist mechanism coupled to the differential actuator and the output device, the power assist mechanism provides an assist torque responsive to a torque sensor. In addition, the input gear is delashed with a planet gear. The system further includes a controller that is configured to control the ratio between the input device and the output device.

There are numerous advantages to incorporating differential actuator 130, which is a normalized speed changing differential, into an active steering system. Typically steering geometry is defined based on road load management, and a compromise between steering responsiveness and steering safety. Optimum steering component geometry is chosen such that road loads are efficiently and effectively reacted with minimal structure within available space and with a compromise responsiveness. An overall steering ratio (OSR) results that is a ratio of handwheel angle over corresponding roadwheel angle. In relative terms a low OSR results in a quick reacting steering system with high load reaction, and a high OSR results in a slower reacting steering system with lower load reaction. Active steering systems allow the OSR to be variable by providing additional steering inputs actively by, for example, an electric motor input to the differential. When this input is absent, the OSR will be a default relationship of (OSR without differential x differential ratio). Application of a speed changing differential with this optimized steering geometry will either alter the default steering behavior away from the optimum, or require modifications to the optimized steering geometry to retain equivalent default steering behavior.

The range of active OSR is defined to provide reduced operator work at low vehicle speed, and enhanced safety at high vehicle speed, with sufficient bandwidth for stability correction. The choice of default OSR has performance implications over the active OSR range as well as the default condition. Choosing a low default OSR will require minimum motor generated steering augmentation for low vehicle speed operation (low OSR), but significant motor generated augmentation for high vehicle speed operation (high OSR) and stability correction. Low default OSR choices are limited by the sensitivity of the operator to OSR changes associated with any system fault condition, where the OSR will change from some active OSR to the default OSR.

Choosing a high default OSR will require minimum motor generated steering augmentation for high vehicle speed operation (high OSR), but significant motor generated augmentation for low vehicle speed operation (low OSR).

An active steering system with a speed changing differential with a pinion upsized with respect to an optimized non-active steering system pinion, by a ratio reciprocal to the speed change ratio, will normalize the effect of the differential ratio and provide a combination of optimum OSR and balanced actuator performance demands over the active steering OSR range.

It will be appreciated that the use of first and second or other similar nomenclature for denoting similar items is not intended to specify or imply any particular order unless otherwise stated.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A steering system comprising:
   a differential transmission having an input shaft and an output shaft;
   a rotary input device attached to the input shaft;
   a movable steering effector in operable communication with the output shaft;
   an angular-to-linear converter which converts a rotative motion of the output shaft to a linear motion that acts to move the steering effector, wherein the motion of the steering effector enables path alteration of a vehicle; and,
   an electromotive actuator, in operable communication with the differential transmission, wherein an activated electromotive actuator provides an active alteration of a speed change between a speed of the input shaft and a speed of the output shaft and a deactivated electromotive actuator provides a default speed change between the speed of the input shaft and the speed of the output shaft.

2. The steering system of claim 1 wherein the differential transmission is a planetary gear set having a gear ratio and the angular-to-linear converter having a translational ratio wherein the translational ratio neutralizes the effect of the planetary gear ratio.

3. The steering system of claim 2 further comprising a hydraulic or electric power assisted steering mechanism wherein the steering mechanism is disposed between the differential transmission and the steering effector.

4. The steering system of claim 1 wherein the angular-to-linear converter is a rack and pinion gear.

5. The steering system of claim 2 wherein the planetary gear set includes a sun gear, a ring gear, and a plurality of planet gears, attached to a carrier, in mesh with the sun gear and the ring gear, a first planetary gear element that is one of the elements consisting of the sun gear, the ring gear, and the carrier, is operatively connected to the input device, a second planetary gear element that is another one of the elements consisting of the sun gear, the ring gear, and the carrier, and that is not connected to the input device is connected to the angular-to-linear converter, a third planetary gear element that is the other of the elements consisting of the sun gear, the ring gear; and the carrier and that is not connected to the input device and the angular-to-linear converter is operatively connected to the electromotive actuator.

6. The steering system of claim 5 further comprising a torque transmitting element wherein the torque transmitting element is in operable communication with the electromotive actuator and is axially connected to the sun gear, the torque transmitting element and the sun gear are oriented concentrically around the input shaft wherein a bearing is disposed between the input shaft and the torque transmitting element and sun gear, the input shaft is rotationally coupled to the ring gear, and the carrier is in operable communication with the angular-to-linear converter and axially disposed between the ring gear and the torque transmitting element.

7. The steering system of claim 6 wherein a bearing is disposed between the carrier and a sun gear shaft.

8. The steering system of claim 6 wherein the torque transmitting element is a spur gear driven by a gear train attached to the electromotive actuator.

9. The steering system of claim 6 wherein the torque transmitting element is a worm gear in mesh with a worm driven by an electromotive actuator.

10. The steering system of claim 6 wherein the planetary gear set has a gear ratio between 1.3:1 and 1.7:1.

11. The steering system of claim 6 further comprising a control unit wherein the control unit prescribes the speed change between the speed of the input shaft and the speed of the output shaft based on at least one parameter of a group of parameters consisting of operator input, position, speed, lateral acceleration, and yaw rate.

12. The steering system of claim 11 wherein the control unit communicates with a storage medium containing a first database of predefined relationships relating vehicle speed, operator input position, and operator input speed to a desired steering ratio.

13. The steering system of claim 11 wherein the control unit communicates with a storage medium containing a second database of predefined relationships relating vehicle speed to maximum stable yaw rate.

14. The steering system of claim 6 further comprising a steering valve disposed between the rotary input device and the differential transmission.

15. The steering system of claim 14 wherein the control unit, in communication with the differential transmission and the steering valve, is configured to provide a supplemental torque to the input device.

16. The steering system of claim 6 further comprising a torque sensor disposed between the input device and the differential transmission.

* * * * *